(12) United States Patent
Peta

(10) Patent No.: US 6,227,217 B1
(45) Date of Patent: May 8, 2001

(54) ROOF MOUNTED GOLF BAG CANOPY

(75) Inventor: Joseph G. Peta, Baldwinsville, NY (US)

(73) Assignee: J. G. Peta, Inc., NY (US)

( * ) Notice: Subject to any disclaimer, the term of this patent is extended or adjusted under 35 U.S.C. 154(b) by 0 days.

(21) Appl. No.: 09/493,703

(22) Filed: Jan. 28, 2000

(51) Int. Cl.$^7$ .................................................... E04H 15/06
(52) U.S. Cl. ................................ 135/88; 296/83; 296/23; 5/119; 160/45
(58) Field of Search ............................ 135/88.03, 88.15, 135/88.16, 16, 88.13, 120.1, 127, 128; 296/77.1, 79, 100.14

(56) References Cited

U.S. PATENT DOCUMENTS

| | | | |
|---|---|---|---|
| 2,930,051 | * 3/1960 | Kampmeier | 5/119 |
| 3,466,082 | * 9/1969 | Branch | 296/23 |
| 3,671,071 | 6/1972 | Evinrude . | |
| 3,918,510 | * 11/1975 | Hayward | 160/45 |
| 4,008,874 | 2/1977 | Conway, Jr. . | |
| 4,013,315 | 3/1977 | West . | |
| 4,037,614 | 7/1977 | Hines et al. . | |
| 4,097,169 | * 6/1978 | Kelly | 403/391 |
| 4,098,536 | 7/1978 | Mills . | |
| 4,310,194 | * 1/1982 | Biller | 296/159 |
| 4,830,037 | 5/1989 | Held . | |
| 5,758,379 | * 6/1998 | Tamburelli | 135/88.09 |

FOREIGN PATENT DOCUMENTS 3517-967A    5/1985  (DE) .

* cited by examiner

Primary Examiner—Carl D. Friedman
Assistant Examiner—Steve Varner
(74) Attorney, Agent, or Firm—George R. McGuire; Hancock & Estabrook, LLP

(57) ABSTRACT

A golf bag canopy adapted to be mounted to a golf cart roof, and particularly to the rear edge of a golf cart roof. The canopy assembly essentially includes an elongated awning track, a pair of J-bar frame members, one of which is attached to either end of the awning track, a U-shaped bow frame member attached to the ends of each J-bar for pivotal movement with respect thereto, and a pliable cover having a leading edge securely attached to the awning track and a body draped over and supported by the U-shaped bow. By pivotally moving the U-shaped bow between its terminal positions, the cover correspondingly moves between covered and uncovered relation to the golf bag compartment of a golf cart. The cover may be positioned in covered relation relative to the golf bag cover during times of inclement weather, or may be positioned in uncovered relation relative to the golf bag compartment when accessing a club. The cover may be retained in its open position by attaching a strap between the U-shaped bow and one of the J-bars.

31 Claims, 4 Drawing Sheets

ROOF MOUNTED GOLF BAG CANOPY

BACKGROUND OF THE INVENTION

The present invention relates generally to protective coverings for golf bags, and more particularly to such protective coverings that are mounted to a golf cart for movement between covered and uncovered relation with respect to a golf bag mounted on the rear of a golf cart.

Golf is a game which requires its players to travel a great distance in order to complete a typical round of 9 or 18 holes. While walking a course and carrying a golf bag, or having a caddy carry a golf bag, is a typical means of traversing a course, many players prefer the speed and comfort of using a golf cart to move about a course.

When using a golf cart, a player's clubs are positioned in a golf bag compartment positioned at the rear of the cart. With many styles of carts, the compartment in which the players sit includes a roof positioned in covering relation thereover. The golf bag compartment is, however, uncovered, thereby leaving the bags, and clubs positioned within the bags, exposed to the elements.

As golf bags and clubs are relatively expensive tools of the sport, their owners generally take care to preserve them. Consequently, keeping the clubs and bags out of inclement weather, such as rain, is generally considered good maintenance. Thus, as many play the game of golf in inclement weather, it is useful to have an apparatus to cover their clubs positioned on the rear of the carts.

There have been several covers created to provide shelter for golf bag and clubs positioned on the rear of a cart. Examples can be readily seen in U.S. Pat. No. 4,008,874 to Conway, Jr.; U.S. Pat. No. 3,671,071 to Evinrude; U.S. Pat. No. 4,037,614 to Hines, et al.; U.S. Pat. No. 4,098,536 to Mills; U.S. Pat. No. 4,013,315 to West; and U.S. Pat. No. 4,830,037 to Held. The '315 and '536 patents each teach covers which loosely drape over the golf bags positioned on the rear of the cart. While these covers do serve their intended purpose, they are cumbersome and do not provide easy access to the clubs. The '874 and '037 patents each teach covers which mount to the sweater basket posts or rear roof support posts. These devices also serve their intended purpose, but lack versatility due to the varying designs of the rear post assemblies of golf carts. Moreover, these devices are also cumbersome and difficult to effectively install.

It is therefore a principal object and advantage of the present invention to provide a roof mounted, golf bag canopy that is lightweight and easy to install on golf carts.

It is an additional object and advantage of the present invention to provide a roof mounted golf bag canopy that is inexpensive to manufacture and distribute.

It is a further object and advantage of the present invention to provide a roof mounted golf bag canopy that may effectively be positioned in covered or uncovered relation to a golf bag.

Other objects and advantages of the present invention will in part be obvious, and in part appear hereafter.

SUMMARY OF THE INVENTION

In accordance with the foregoing objects and advantages, the present invention is essentially comprised of an awning track that is fixedly secured along the rear edge of a golf cart's roof, and a canopy assembly removably attached to the awning track. The canopy assembly includes a fabric cover supported by a framework that permits it to be pivotally moveable between covered and uncovered relation with respect to a golf bag positioned in the golf bag compartment at the rear of the cart.

More specifically, the framework includes a pair of J-bars, one attached to and extending downwardly from each end of the awning track, a U-shaped bow pivotally attached at its ends to the ends of the J-bars, and a stabilizer rod extending horizontally across and attached to the J-bars at their respective vertices. The entire framework hangs freely from the awning track, and the U-shaped bow provides the structural support for the cover.

To install the canopy on a golf cart, the awning track is secured to the rear edge of the roof by screws or similar fasteners passing therethrough. A dowel, which is longitudinally inserted into an open-looped leading edge of the cover, is then longitudinally inserted into a C-shaped channel formed in the awning track.

In operation, a user manually pivots the U-shaped bow in order to move the cover into and out of covering relation to the golf bags positioned on the rear of the cart. When in its non-covering position, a strap securely attached to the bow may be releasably secured (via a strap having a snap fastener, VELCRO® strap, or the like) to the vertically extending portion of one of the J-bars in order to prevent inadvertent opening thereof.

BRIEF DESCRIPTION OF THE DRAWINGS

The present invention will be more fully understood by reading the following detailed description in conjunction with the accompanying drawings, wherein.

DETAILED DESCRIPTION

Figure 1:
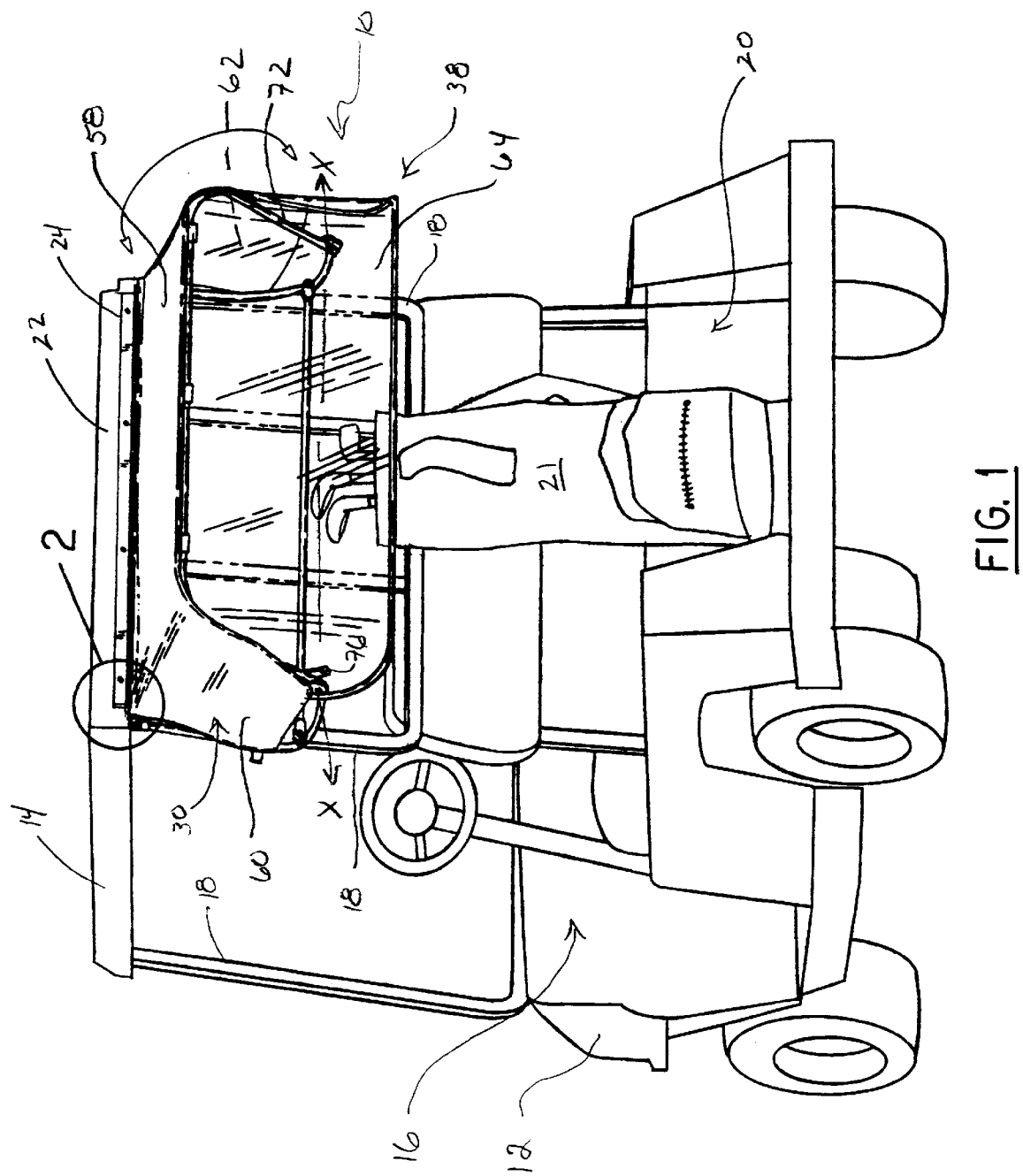
FIG. 1 is a perspective view of the present invention in its closed position attached to a conventional golf cart.
Figure 2:
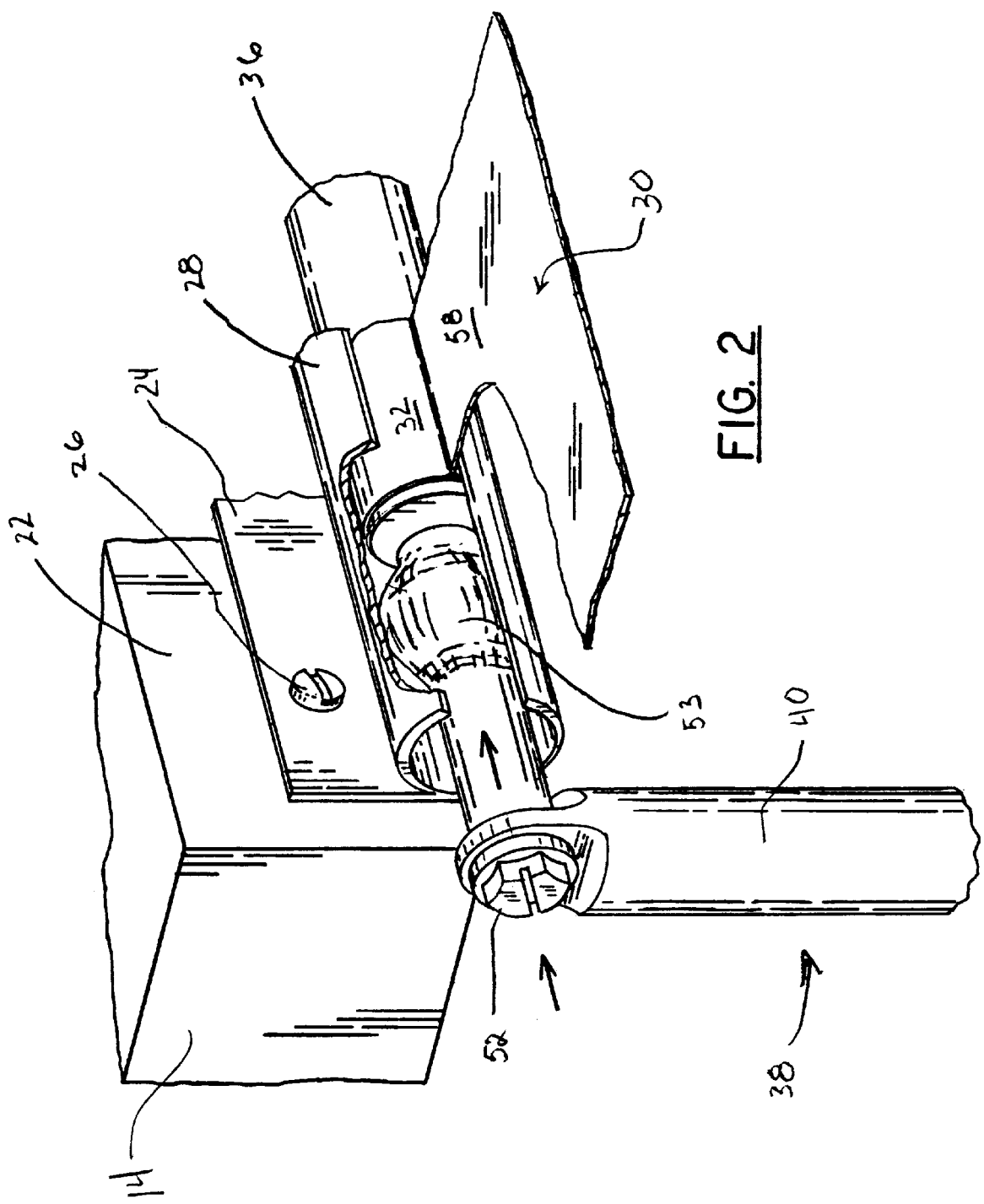
FIG. 2 is an enlarged, partial cross-sectional view of the mounting portion of the present invention.
Figure 3:
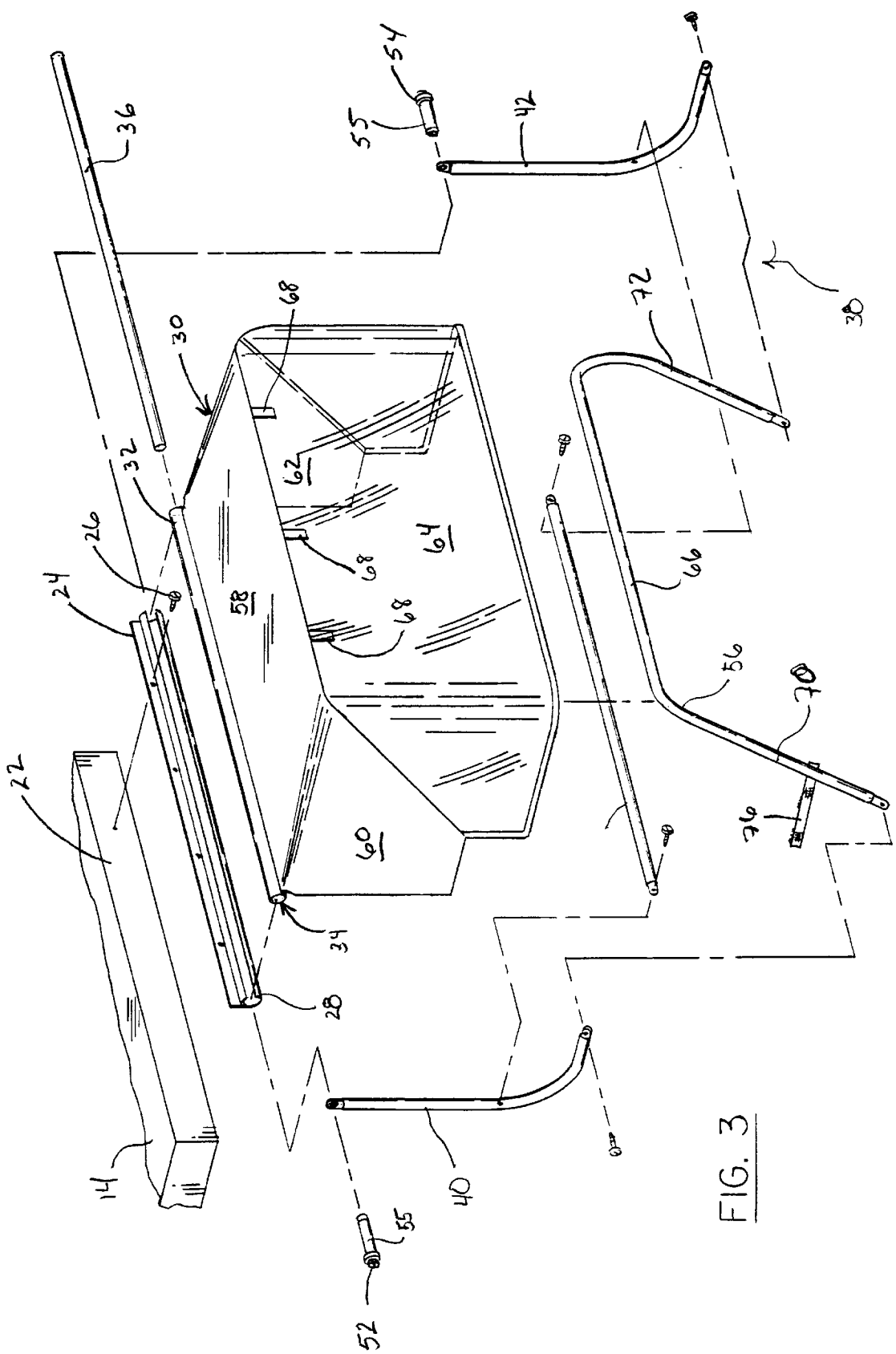
FIG. 3 is an exploded perspective of the present invention.

Referring now to the drawing figures, wherein like reference numerals refer to like parts throughout, there is seen in FIG. 1 a golf bag canopy, denoted generally by reference numeral 10, attached to a conventional golf cart 12. Golf cart 12 includes a roof 14 supported in vertically spaced relation above a passenger compartment 16 by a series of vertically extending posts 18 positioned at the corners thereof, and a golf bag compartment 20 positioned at the rear of cart 12. Roof 30 includes a rear edge 22 extending transversely across cart 12 in a vertically extending plane that is essentially at the junction of passenger compartment 16 and golf bag compartment 20. A golf bag 21 is positioned on golf bag compartment 20. Cart 20 is conventional in all respects, and common manufactures include Club Car, Inc.; E-Z Go; and Yamaha.

Golf bag canopy 10 is mounted to cart 12 by an awning track 24 that is securely attached to the roof's rear edge 22 via screws 26, or any similar fastener. Awning track 24 includes a C-shaped channel 28 facing rearwardly in relation to the cart. As will be explained in greater detail hereinafter, C-shaped channel 28 operatively retains golf bag canopy 10 to cart 12.

Golf bag canopy 10 includes a pliable fabric cover 30 having a leading edge 32 which is stitched back upon itself to form an opening 34 extending the length thereof. For reasons which will become apparent hereinafter, the length of leading edge 32 is preferably slightly shorter than the length of rear edge 22. An elongated dowel 36 having a length about equal to that of leading edge 32 is longitudinally inserted in opening 34 to provide rigidity to edge 32. Dowel 36, together with leading edge 32, is longitudinally inserted into C-shaped channel 28, thereby interconnecting cover 30 to awning track 24.

Canopy 10 further includes a frame assembly, designated generally by reference numeral 38, which is attached to awning track 24 and which provides a structural framework for cover 30. Frame assembly 38 includes a pair of J-bars 40, 42, each of which includes respective vertically extending portions 44, 46, and horizontally extending portions 48, 50. The terms "horizontal" and "vertical" as used herein refer to the general orientation of the referenced members when used in the intended manner. Each J-bar 40, 42 is attached to respective ends of C-shaped channel 28 via well nuts 52, 54 respectively. Well nuts 52, 54 include rubber compression sleeves 53, 55, respectively, positioned thereover to securely retain them within C-shaped channel 28. When attached in this manner, J-bars 40, 42 hang freely (i.e., by gravity) from awning track 24.

Frame assembly 38 further includes a U-shaped bow 56 pivotally attached at each of its two ends to respective ends of horizontally extending portions 48, 50. U-shaped bow 56 is pivotally movable relative to J-bars 40, 42 about an axis X—X extending through each of its ends.

Referring to FIG. 1, when in its open position, cover 30 is seen to include a top portion 58 extending from leading edge 32 rearwardly relative to cart 12, opposing side flaps 60, 62 extending downwardly from top portion 58 and in respective planes that are generally parallel to the longitudinal axis of cart 12, and a rear flap 64 extending downwardly from top portion 58, between side flaps 60, 62, and in a plane that is generally transverse to the longitudinal axis of cart 12. Although top portion 58, side flaps 60, 62 and rear flap 64 can be made from any pliable material, such as canvas, polyester, nylon, or plastic, rear flap 64 is preferably made from a transparent, pliable material, such as nylon, to permit a driver of cart 12 to see therethrough.

Figure 4:
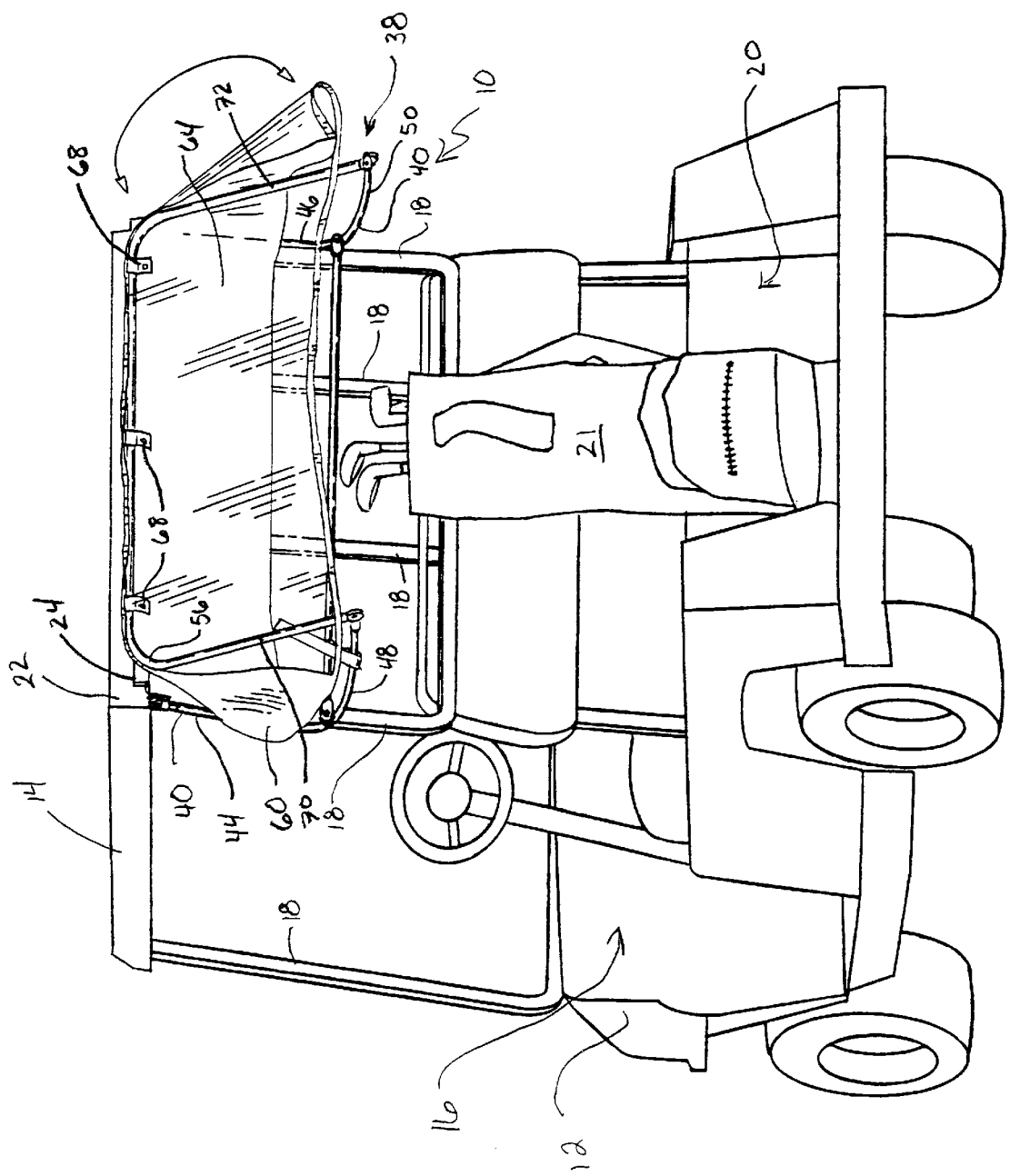
FIG. 4 is a perspective view of the present invention in its open position attached to a conventional golf cart.
Figure 1:
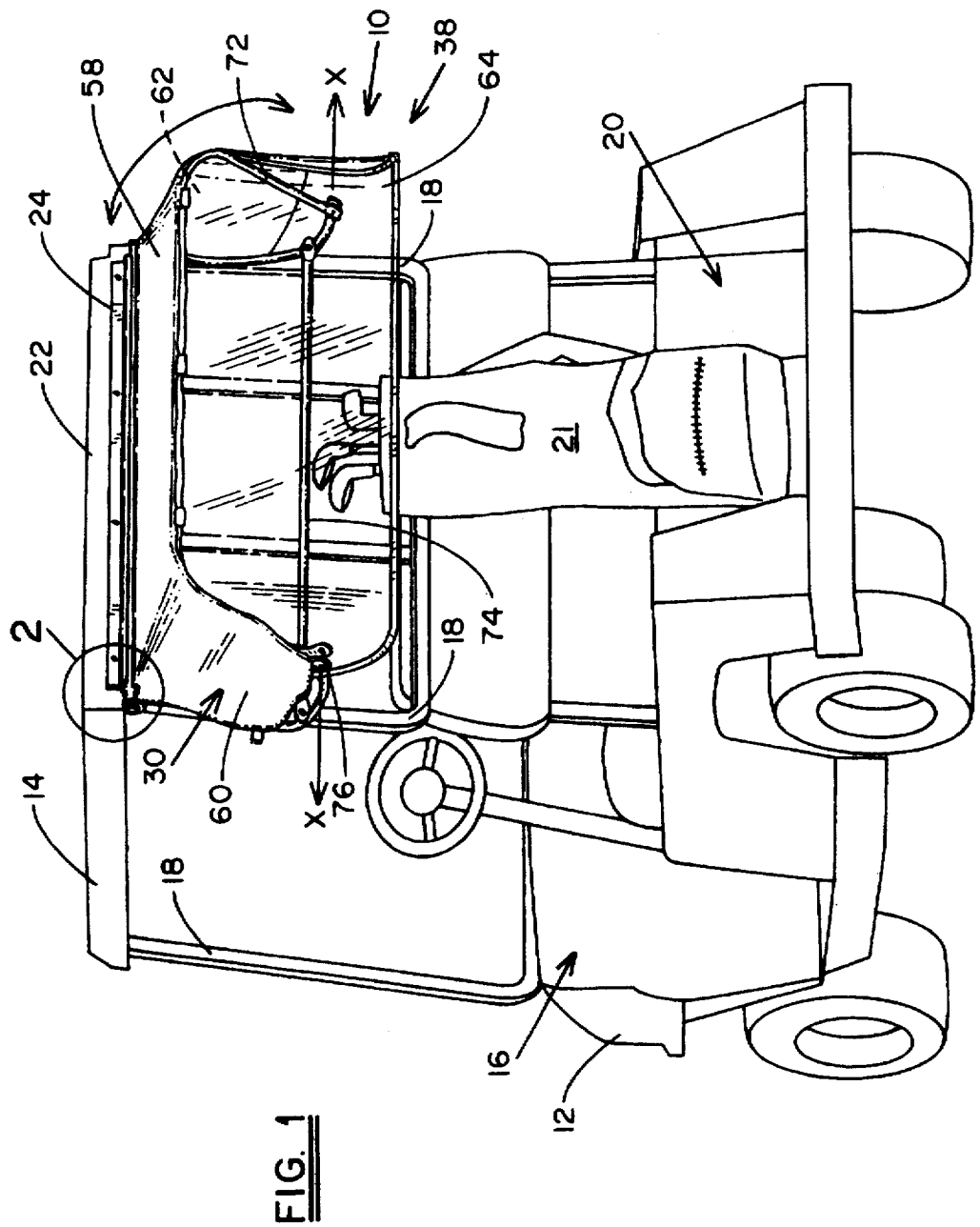
Figure 2:
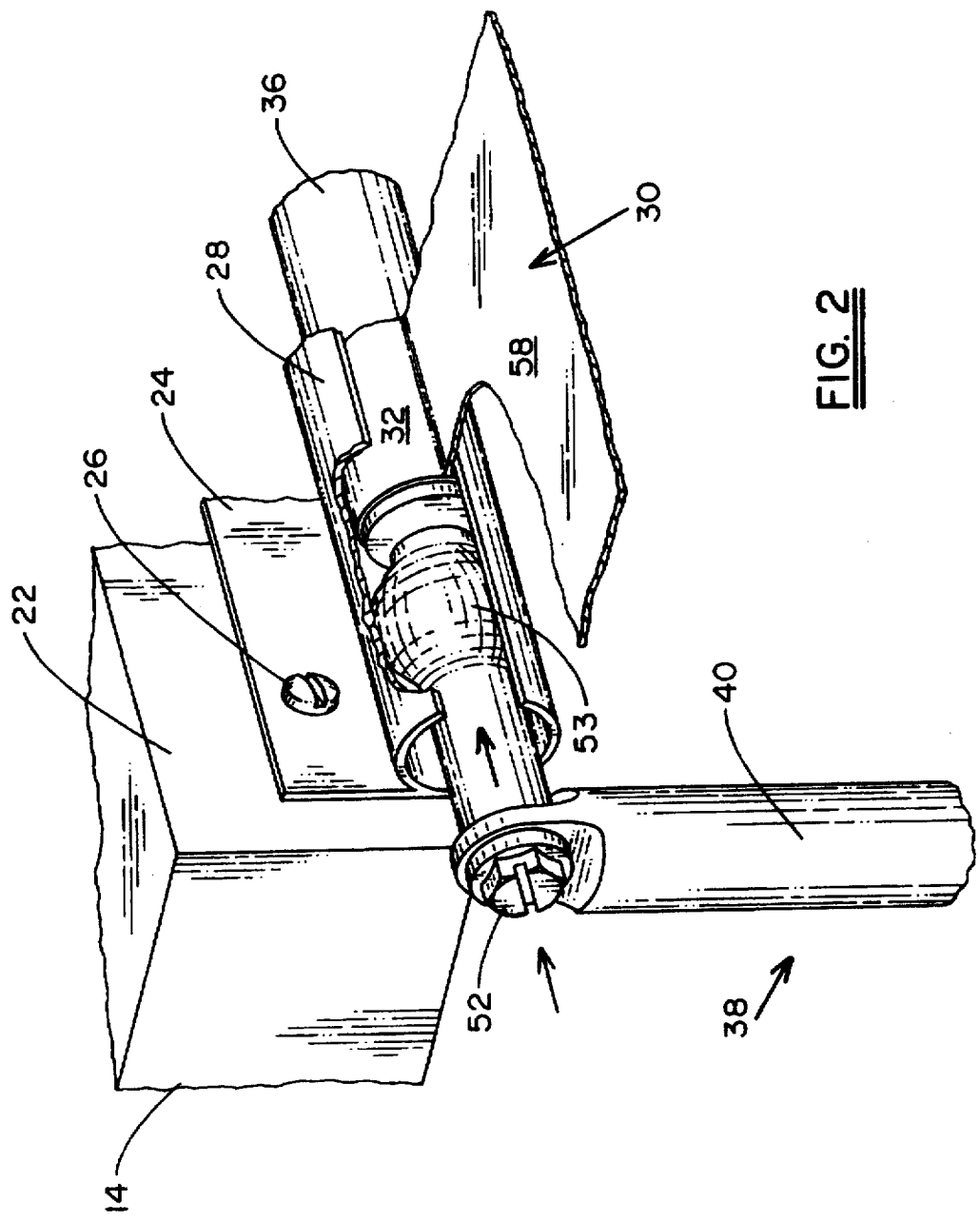
Figure 3:
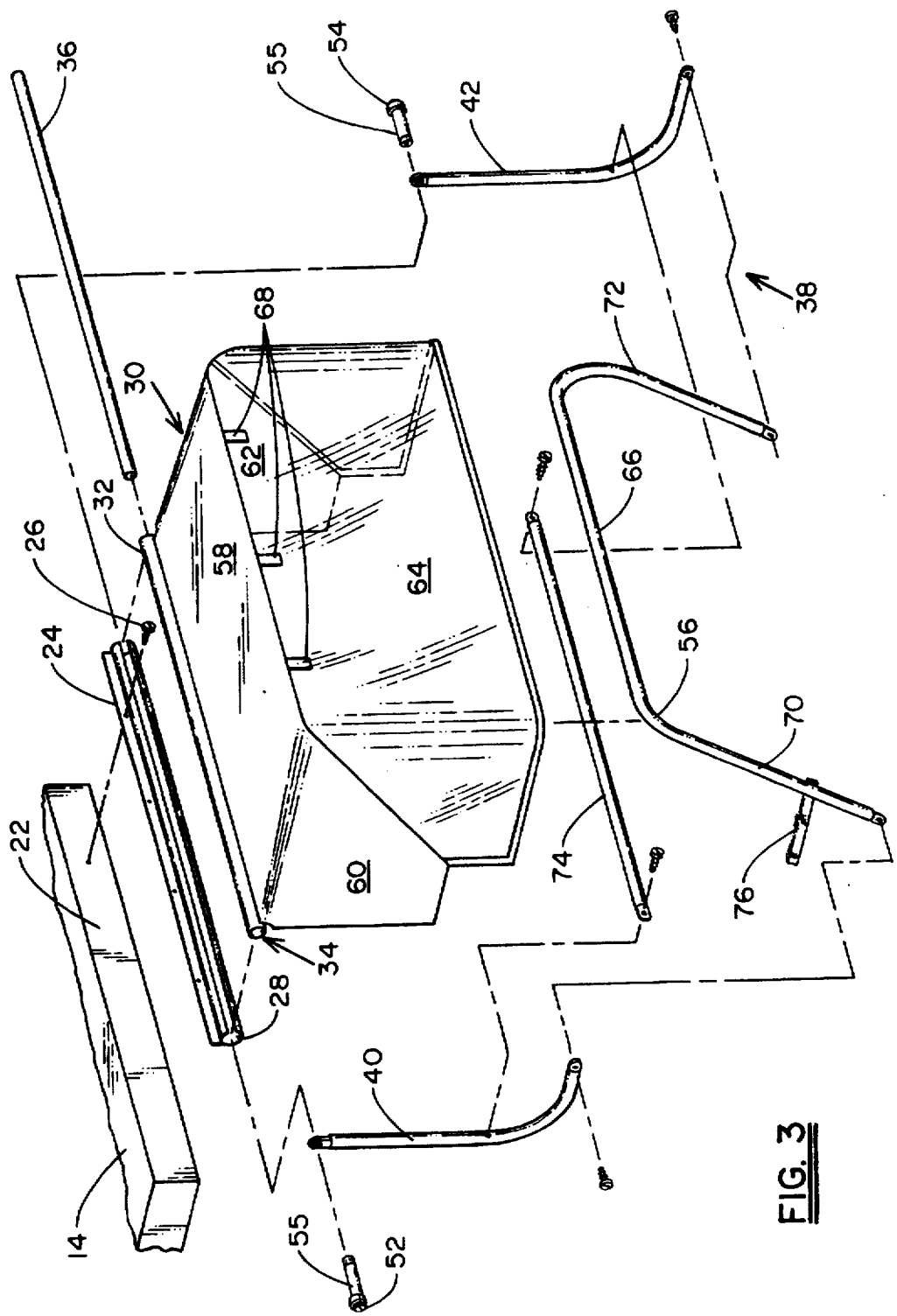
Figure 4:
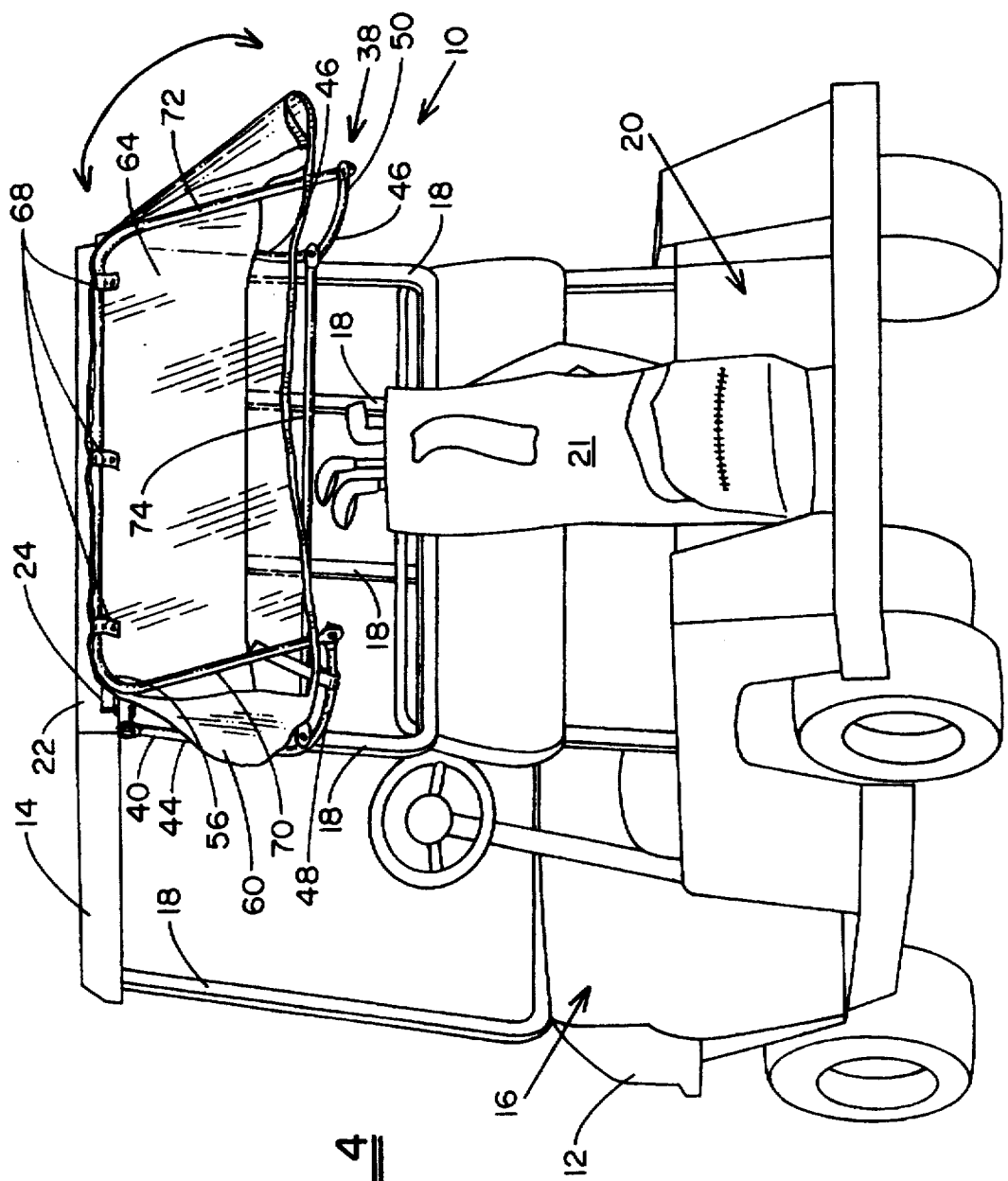

Cover 30 is structurally supported by U-shaped bow 56, thereby permitting cover 30 to be moved between covered (see FIG. 1) and uncovered (see FIG. 4) positions relative to golf bag compartment 20. The medial portion 66 of bow 56 is secured to the inside of cover 30 at the junction of top portion 58 and rear flap 64 via VELCRO® straps 68, or any similar fastener (snaps, clips, buckles, etc. . . . ). While not connected in any way, the two legs 70, 72 of bow 56 are positioned inwardly adjacent to the junction between top portion 58 and side flaps 60, 62 respectively. Accordingly, pivotally moving U-shaped bow 56 towards and away from cart roof 14 causes cover 30 to move between uncovered and covered, respectively, relation to golf bag compartment 20.

Frame assembly 38 finally includes a rod 74 extending between and attached to J-bars 40, 42, thereby providing structural integrity and rigidity to the frame assembly 38 as a whole. Rod 74 is illustrated as extending along a horizontal axis and being connected at its ends to J-bars 40, 42 at their vertices. It should be understood, however, that rod 74 could anchor to J-bars 40, 42 anywhere along their lengths so as to provide rigidity to frame structure 38 as a whole.

In order to prevent inadvertent opening of cover 30 when in its closed position, a strap 76 having VELCRO® fasteners thereon is fixedly attached to at least one of legs 70 or 72 (shown at leg 70) and may securely engage vertically extending portion 44 or 46 (shown at 44), respectively, thereby retaining bow 56 and J-bar 40 (or 42) in interconnected relation.

In addition, to further prevent accidental opening of cover 30 when in its closed position, the length of horizontally extending portions 48, 50 and the corresponding lengths of legs 70, 72 are such that when cover 30 is in its closed position, the center of gravity of bow 58 when cover 30 is closed is vertically lower than the center of gravity of bow 58 when cover 30 is in its open position. Thus bow 58 physically acts in a manner analogous to what is commonly referred to as an "over-center" spring, when moved between its open and closed positions.

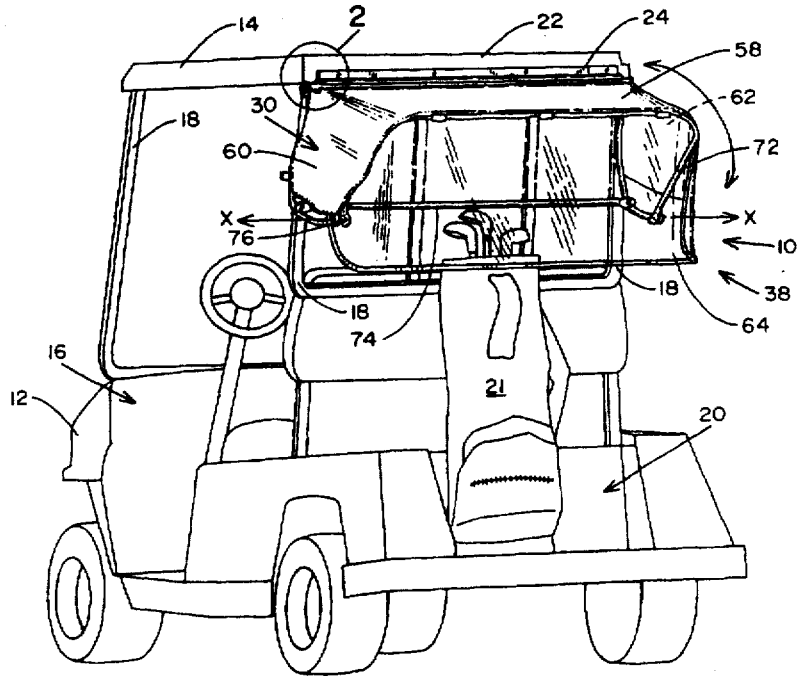

What is claimed is:

1. A golf bag canopy adapted to be mounted to a golf cart roof, comprising:
   a) a longitudinal track adapted to be attached to said golf cart roof, and including opposing first and second ends;
   b) first and second frame members attached to said track at said first and second ends thereof, respectively;
   c) a third frame member attached to said first and second frame members for movement relative thereto between first and second terminal positions;
   d) a fourth frame member attached to and extending between said first and second frame members; and
   e) a cover including a leading edge securely attached to said track, said cover being structurally supported by said third frame member, and being moveable therewith between said first and second terminal positions.

2. The golf bag canopy of claim 1, and further comprising a strap having a first end fixedly attached to said third frame member and a second end removably attachable to either of said first and second frame members.

3. The golf bag canopy of claim 1, and further comprising at least one strap interconnecting said third frame member to said cover.

4. The golf bag canopy of claim 1, wherein at least a portion of said cover is composed of a transparent, pliable material.

5. The golf bag canopy of claim 1, wherein said first and second frame members are each generally J-shaped with first and second vertically extending portions and first and second horizontally extending portions, respectively.

6. The golf bag canopy of claim 5, wherein said third frame member is a U-shaped bow having first and second leg portions integrally bridged by a medial portion, said first and second leg portions being pivotally connected to said first and second horizontally extending portions, respectively.

7. The golf bag canopy of claim 6, wherein said cover includes a top portion extending rearwardly relative to said leading edge, first and second opposing side flaps extending downwardly from said top portion, and a rear flap extending downwardly from said top portion and between said first and second flaps.

8. The golf bag canopy of claim 7, wherein said medial portion of said third frame member is releasably secured to said cover at the juncture of said top portion and said rear flap.

9. The golf bag canopy of claim 7, wherein said first and second legs of said third frame member are positioned adjacent the juncture of said rear flaps and said first and second side flaps, respectively, of said cover.

10. The golf bag canopy of claim 1, wherein said track includes a C-shaped channel attached thereto.

11. The golf bag canopy of claim 10, wherein said leading edge of said cover is stitched back upon itself, thereby forming an opening extending along the entire length thereof.

12. The golf bag canopy of claim 11, and further comprising an elongated dowel positioned within said opening formed in said cover.

13. A golf bag canopy assembly adapted to be mounted to a golf cart roof, comprising:
   a) means for mounting said canopy assembly to said golf cart roof;
   b) first frame means attached to said mounting means;
   c) second frame means attached to said first frame means for movement relative thereto between first and second terminal positions;
   d) third frame means attached to said second frame means for providing rigidity thereto; and
   e) a cover including a leading edge that is attached to said mounting means, said cover being structurally supported by said second frame means and being movable therewith between said first and second terminal positions.

14. The golf bag canopy of claim 13, wherein said mounting means is comprised of an elongated track having first and second opposing ends, and being fixedly attached to said golf cart roof.

15. The golf bag canopy of claim 14, wherein said track includes a C-shaped channel formed longitudinally therealong.

16. The golf bag canopy of claim 14, wherein said first frame means includes first and second frame members attached to said first and second ends, respectively, of said track.

17. The golf bag canopy of claim 16, wherein said first and second frame members are each J-bars.

18. The golf bag canopy of claim. 16, wherein said second frame means includes a third frame member that is moveably attached to said first and second frame members.

19. The golf bag canopy of claim 18, wherein said third frame member is a U-shaped bow.

20. The golf bag canopy of claim 13, wherein at least a portion of said cover is transparent.

21. A golf bag canopy assembly adapted to be mounted to a golf cart roof, comprising:
   a) a longitudinal track adapted to be attached to said golf cart roof, and including opposing first and second ends;
   b) first and second frame members attached to said track at said first and second ends thereof, respectively;
   c) a third frame member attached to said first and second frame members for movement relative thereto between first and second terminal positions;
   d) a cover including a leading edge securely attached to said track, said cover being structurally supported by said third frame member, and being movable therewith between said first and second terminal positions; and
   e) a strap having a first end attached to said third frame member and a second end attached to either of said first and second frame members.

22. The golf bag canopy of claim 21, and further comprising at least one strap interconnecting said third frame member to said cover.

23. The golf bag canopy of claim 21, wherein at least a portion of said cover is composed of a transparent, pliable material.

24. The golf bag canopy of claim 21, wherein said first and second frame members are each generally J-shaped with first and second vertically extending portions and first and second horizontally extending portions, respectively.

25. The golf bag canopy of claim 24, wherein said third frame member is a U-shaped bow having first and second leg portions integrally bridged by a medial portion, said first and second leg portions being pivotally connected to said first and second horizontally extending portions, respectively.

26. The golf bag canopy of claim 25, wherein said cover includes a top portion extending rearwardly relative to said leading edge, first and second opposing side flaps extending downwardly from said top portion, and a rear flap extending downwardly from said top portion and between said first and second flaps.

27. The golf bag canopy of claim 26, wherein said medial portion of said third frame member is releasably secured to said cover at the juncture of said top portion and said rear flap.

28. The golf bag canopy of claim 26, wherein said first and second legs of said third frame member are positioned adjacent the juncture of said rear flaps and said first and second side flaps, respectively, of said cover.

29. The golf bag canopy of claim 21, wherein said track includes a C-shaped channel attached thereto.

30. The golf bag canopy of claim 29, wherein said leading edge of said cover is stitched back upon itself, thereby forming an opening extending along the entire length thereof.

31. The golf bag canopy of claim 30, and further comprising an elongated dowel positioned within said opening formed in said cover.

* * * * *

UNITED STATES PATENT AND TRADEMARK OFFICE
CERTIFICATE OF CORRECTION

PATENT NO.    : 6,227,217 B1
DATED         : May 8, 2001
INVENTOR(S)   : Joseph G. Peta It is certified that error appears in the above-identified patent and that said Letters Patent is hereby corrected as shown below:

Title page,
The title page showing the illustrative figure should be deleted to be replaced with the attached title page.

Drawings,
Sheets 1-4, consisting of Fig. 1-4 should be deleted and substitute therefore the corrected Sheets 1-4, as shown on the attached pages.

Signed and Sealed this

Twelfth Day of February, 2002

Attest:

JAMES E. ROGAN
*Director of the United States Patent and Trademark Office*

*Attesting Officer*

United States Patent
Peta

(10) Patent No.: US 6,227,217 B1
(45) Date of Patent: May 8, 2001

(54) ROOF MOUNTED GOLF BAG CANOPY

(75) Inventor: Joseph G. Peta, Baldwinsville, NY (US)

(73) Assignee: J. G. Peta, Inc., NY (US)

(*) Notice: Subject to any disclaimer, the term of this patent is extended or adjusted under 35 U.S.C. 154(b) by 0 days.

(21) Appl. No.: 09/493,703

(22) Filed: Jan. 28, 2000

(51) Int. Cl.⁷ .................................... E04H 15/06
(52) U.S. Cl. .................. 135/88; 296/83; 296/23; 5/119; 160/45
(58) Field of Search ................ 135/88.03, 88.15, 135/88.16, 16, 88.13, 120.1, 127, 128; 296/77.1, 79, 100.14

(56) References Cited

U.S. PATENT DOCUMENTS

| | | | |
|---|---|---|---|
| 2,930,051 | * 3/1960 | Kampmeier | 5/119 |
| 3,466,082 | * 9/1969 | Branch | 296/23 |
| 3,671,071 | 6/1972 | Evinrude | |
| 3,918,510 | * 11/1975 | Hayward | 160/45 |
| 4,008,874 | 2/1977 | Conway, Jr. | |
| 4,013,315 | 3/1977 | West | |
| 4,037,614 | 7/1977 | Hines et al. | |
| 4,097,169 | * 6/1978 | Kelly | 403/391 |
| 4,098,536 | 7/1978 | Mills | |
| 4,310,194 | * 1/1982 | Biller | 296/159 |
| 4,830,037 | 5/1989 | Held | |
| 5,758,379 | * 6/1998 | Tamburelli | 135/88.09 |

FOREIGN PATENT DOCUMENTS 3517-967A    5/1985 (DE).

* cited by examiner

Primary Examiner—Carl D. Friedman
Assistant Examiner—Steve Varner
(74) Attorney, Agent, or Firm—George R. McGuire; Hancock & Estabrook, LLP

(57) ABSTRACT

A golf bag canopy adapted to be mounted to a golf cart roof, and particularly to the rear edge of a golf cart roof. The canopy assembly essentially includes an elongated awning track, a pair of J-bar frame members, one of which is attached to either end of the awning track, a U-shaped bow frame member attached to the ends of each J-bar for pivotal movement with respect thereto, and a pliable cover having a leading edge securely attached to the awning track and a body draped over and supported by the U-shaped bow. By pivotally moving the U-shaped bow between its terminal positions, the cover correspondingly moves between covered and uncovered relation to the golf bag compartment of a golf cart. The cover may be positioned in covered relation relative to the golf bag cover during times of inclement weather, or may be positioned in uncovered relation relative to the golf bag compartment when accessing a club. The cover may be retained in its open position by attaching a strap between the U-shaped bow and one of the J-bars.

31 Claims, 4 Drawing Sheets